United States Patent
Singh et al.

(10) Patent No.: US 7,634,913 B2
(45) Date of Patent: *Dec. 22, 2009

(54) BEARING ASSEMBLY AND METHOD OF MONITORING SAME

(75) Inventors: Anant Pal Singh, Cincinnati, OH (US); Terry Eugene Viel, Hamilton, OH (US); Malcolm John Ashby, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 667 days.

This patent is subject to a terminal disclaimer.

(21) Appl. No.: 11/093,642

(22) Filed: Mar. 30, 2005

(65) Prior Publication Data

US 2006/0218935 A1   Oct. 5, 2006

(51) Int. Cl.
*F02C 1/00* (2006.01)

(52) U.S. Cl. .............. 60/772; 340/870.07; 73/862.322; 324/207.19; 356/32; 384/448

(58) Field of Classification Search ............ 340/870.07, 340/682; 73/862.322, 593, 660; 324/207.19, 324/207.25, 207.62; 356/32–35.5; 702/33–36, 702/40–43, 182–185, 188, 56, 141, 113, 702/122, 179, 181; 384/448; 60/772
See application file for complete search history.

(56) References Cited

U.S. PATENT DOCUMENTS

| | | | | |
|---|---|---|---|---|
| 3,677,072 A | * | 7/1972 | Weichbrodt et al. ........... 73/593 |
| 4,203,319 A | * | 5/1980 | Lechler .................. 73/862.541 |
| 4,225,851 A | | 9/1980 | Reschovsky et al. |
| 4,341,122 A | * | 7/1982 | Lechler et al. ......... 73/862.045 |
| 4,357,104 A | | 11/1982 | Davinson |
| 4,464,935 A | * | 8/1984 | McHugh ...................... 73/660 |
| 4,659,988 A | | 4/1987 | Goff et al. |
| 4,704,895 A | | 11/1987 | Boing et al. |
| 4,941,105 A | * | 7/1990 | Marangoni ................... 702/42 |
| 5,503,030 A | * | 4/1996 | Bankestrom ........... 73/862.627 |
| 5,952,587 A | * | 9/1999 | Rhodes et al. ......... 73/862.541 |
| 6,257,065 B1 | * | 7/2001 | Kyrtsos ....................... 73/654 |
| 6,484,582 B2 | * | 11/2002 | Ehrfeld et al. ................ 73/593 |
| 6,568,091 B1 | | 5/2003 | Mercer et al. |

(Continued)

FOREIGN PATENT DOCUMENTS

GB          1378685 A        12/1974

(Continued)

OTHER PUBLICATIONS

GB Search Report, South Wales; Reference 13DV158133/11280; Application No. GB0601525.9; Apr. 4, 2006 Date of Search; 3 pgs.

*Primary Examiner*—William H Rodriguez
(74) *Attorney, Agent, or Firm*—William Scott Andes, Esq.; Armstrong Teasdale LLP (57) ABSTRACT

A method for predicting bearing failure of a differential bearing including an inner race, an outer race, and a plurality of rolling elements positioned between the inner and outer race. The method includes coupling a strain gage to the differential bearing, generating a bearing performance model, receiving a signal from the strain gage, and comparing the strain gage signal to the bearing performance model to predict a differential bearing failure.

19 Claims, 6 Drawing Sheets

U.S. PATENT DOCUMENTS

| | | | |
|---|---|---|---|
| 6,687,623 B2* | 2/2004 | Bailey et al. | 702/42 |
| 6,766,697 B1* | 7/2004 | Perez et al. | 73/800 |
| 7,034,711 B2* | 4/2006 | Sakatani et al. | 340/686.1 |
| 7,140,228 B2* | 11/2006 | Heim | 73/12.13 |
| 7,241,053 B2* | 7/2007 | Sato et al. | 384/448 |
| 7,389,701 B2* | 6/2008 | Mol | 73/862.322 |
| 2005/0169563 A1* | 8/2005 | Inoue et al. | 384/448 |
| 2005/0259903 A1* | 11/2005 | Takizawa et al. | 384/448 |
| 2006/0107765 A1* | 5/2006 | Sentoku | 73/862.322 |
| 2006/0222278 A1* | 10/2006 | Singh et al. | 384/448 |

FOREIGN PATENT DOCUMENTS

| | | |
|---|---|---|
| GB | 2062875 A | 5/1981 |
| JP | 02-155893 A | 6/1990 |
| JP | 10-104125 A | 4/1998 |

* cited by examiner

FIG. 6
GOOD BEARING WAVEFORM

FIG. 7
SLIGHTLY DAMAGED BEARING WAVEFORM

US 7,634,913 B2

BEARING ASSEMBLY AND METHOD OF MONITORING SAME

STATEMENT REGARDING FEDERALLY SPONSORED RESEARCH OR DEVELOPMENT

The U.S. Government may have certain rights in this invention pursuant to contract number NAS3-01135 Task Order 23.

BACKGROUND OF THE INVENTION

This application relates generally to gas turbine engines, and more particularly, to a bearing assembly used within a gas turbine engine and a method of monitoring same.

Gas turbine engines typically include a fan assembly, a core engine including a compressor, a combustor, and a first turbine, i.e. high-pressure turbine, and a second or low-pressure turbine that is coupled axially aft of the core gas turbine engine. The fan assembly and the low pressure turbine are coupled together using a first shaft, and the compressor and the high-pressure turbine are coupled together using a second shaft. At least one known gas turbine engine also include a differential bearing, i.e. inter-shaft bearing, that is coupled between the first and second shafts, respectively.

During operation, failure of a bearing assembly may result in an In Flight Shut Down (IFSD), and/or an Unscheduled Engine Removal (UER). Therefore, at least one known gas turbine engine includes a magnetic chip detection system that includes a magnet that attracts metallic debris that is created during bearing contact fatigue failures such as, but not limited to micro-spalling, peeling, skidding, indentations, and/or smearing. More specifically, magnetic chip detectors facilitate identifying the presence and quantity of metallic debris in a gas turbine lube oil scavenge line. In addition, a scanning electron microscope (SEM) may be used to determine the source of the metallic debris. However, known magnetic chip detection systems and SEM analysis systems can only detect a bearing spalling that has already occurred.

At least one known gas turbine engine also includes a vibration measurement system that transmits relatively high frequency acoustic emissions through the bearing to verify a bearing failure caused by bearing contact fatigue that has previously occurred. However, known vibration measurement systems may not be able to successfully identify the bearing failure if the transmitted signal is degraded when passed through a lubricant film that is used to lubricate the bearing. Therefore, identifying the bearing component frequencies among a plurality of engine operating frequencies may be relatively difficult. Accordingly, known systems are generally not effective in detecting initial bearing flaws and/or defects that may result in bearing spalling, in monitoring bearing damage and/or spall propagation, or in assessing the overall bearing damage including multi-spall initiations and progression.

BRIEF DESCRIPTION OF THE INVENTION

In one aspect, a method for predicting bearing failure of a differential bearing including an inner race, an outer race, and a plurality of rolling elements positioned between the inner and outer race, is provided. The method includes coupling a strain gage to the differential bearing, generating a bearing performance model, receiving a signal from the strain gage, and comparing the strain gage signal to the bearing performance model to predict a differential bearing failure.

In another aspect, a differential bearing assembly for a rotor is provided. The differential bearing assembly includes an inner race coupled to a first shaft, an outer race coupled to a second shaft, a plurality of rolling elements positioned between the inner and outer races, and a strain gage coupled to the outer race, the strain gage configured to transmit a signal to a bearing monitoring system to facilitate predicting a differential bearing failure.

In a further aspect, a gas turbine engine assembly is provided. The gas turbine engine assembly includes a core gas turbine engine that includes a first rotor shaft, a second rotor shaft, a differential bearing coupled between the first and second rotor shafts, and a strain gage coupled to the differential bearing and configured to transmit a signal to facilitate predicting a failure of the differential bearing failure.

DETAILED DESCRIPTION OF THE INVENTION

Figure 1:
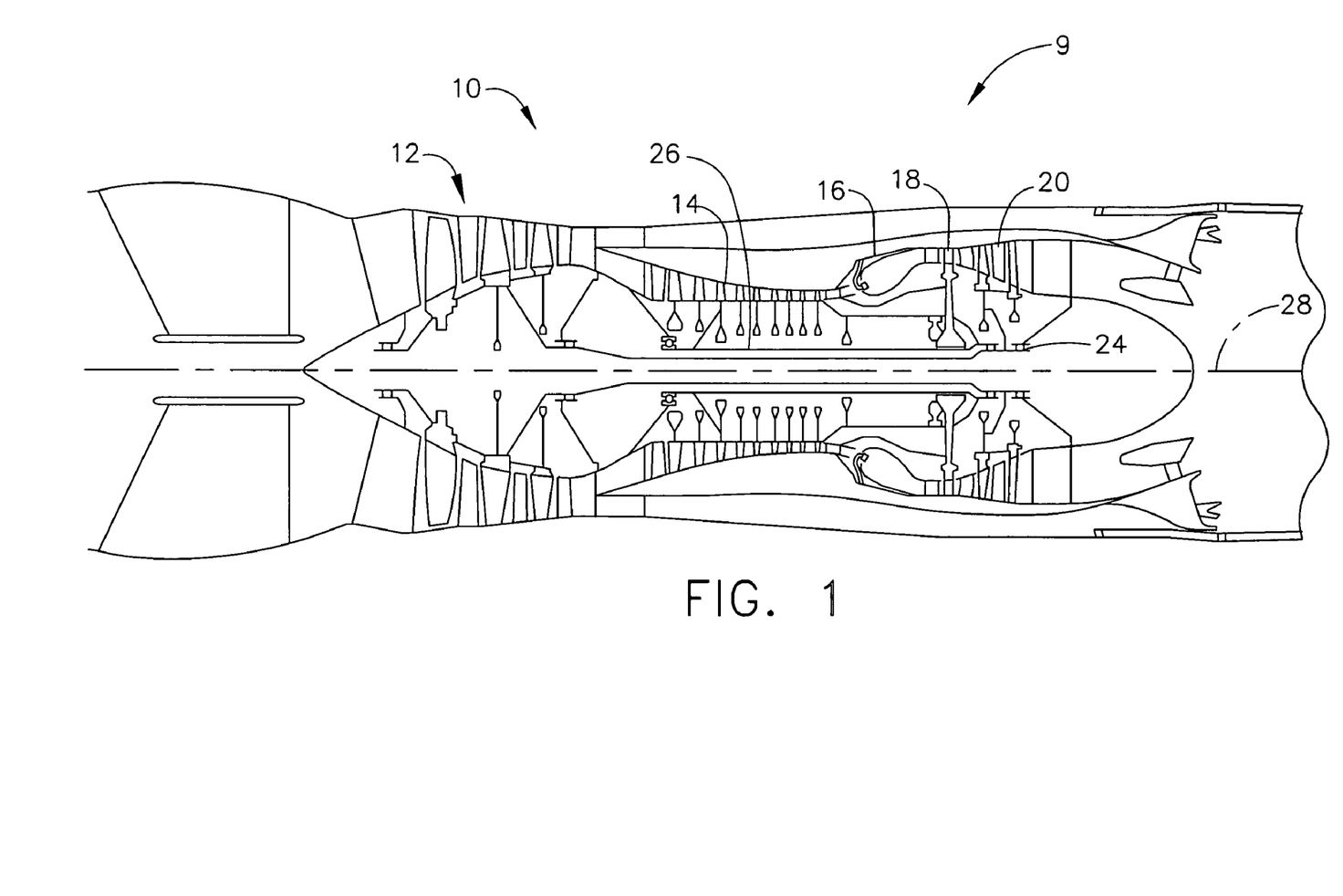
FIG. 1 is schematic illustration of an exemplary gas turbine engine assembly.

FIG. 1 is a schematic illustration of an exemplary gas turbine assembly 9 that includes a core gas turbine engine 10 including a fan assembly 12, a high pressure compressor 14, and a combustor 16. In the exemplary embodiment, gas turbine engine 10 is a military gas turbine engine that is available from General Electric Company, Cincinnati, Ohio. Gas turbine engine 10 also includes a high pressure turbine 18 and a low pressure turbine 20. Fan assembly 12 and turbine 20 are coupled by a first shaft 24, and compressor 14 and turbine 18 are coupled by a second shaft 26. First shaft 24 is coaxially positioned within second shaft 26 about a longitudinal centerline axis 28 of engine 10.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust system (not shown).

Figure 2:
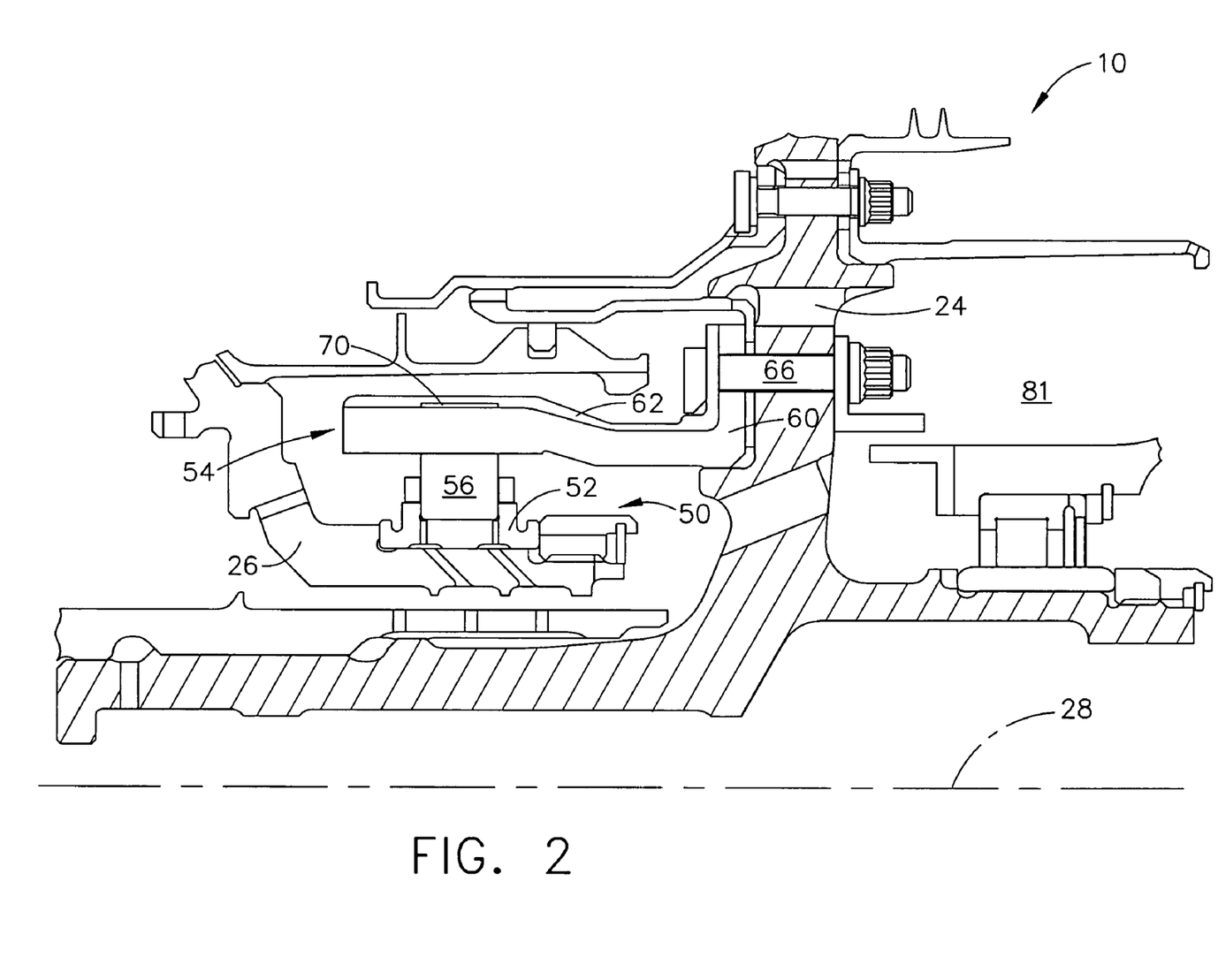
FIG. 2 is a cross-sectional view of an exemplary differential bearing assembly that may be used in the gas turbine engine shown in FIG. 1.

FIG. 2 is a cross-sectional view of an exemplary embodiment of a differential bearing assembly 50 that may be used with a gas turbine engine, such as engine 10 shown in FIG. 1. In the exemplary embodiment, differential bearing assembly 50 is coupled between first shaft 24 and second shaft 26. Although, the invention described herein is with respect to a single differential bearing 50, it should be realized that the invention described herein may also be utilized with a gas turbine engine that includes a plurality of differential bearings 50. Moreover, the invention described herein may also be utilized with a plurality of roller and/or ball bearing assemblies within gas turbine engine 10.

Differential bearing assembly 50 includes a rotating inner race 52 secured to shaft 26 that extends between high pressure turbine 18 and high pressure compressor 14. Differential bearing assembly 50 also includes a rotating outer race 54 that is secured to shaft 24 that extends between low pressure turbine 20 and fan assembly 12, and a plurality of bearings 56, i.e. rolling elements, that are positioned between inner and outer races 52 and 54 respectively. In the exemplary embodiment, bearings 56 are roller bearings. In an alternative embodiment, bearings 56 are ball bearings.

In the exemplary embodiment, (shown in FIG. 2) outer race 54 includes a first portion 60 that is substantially L-shaped, a second portion 62 that is substantially L-shaped, and at least one measuring device 70 that is coupled to first portion 60. In the exemplary embodiment, measuring device 70 is positioned between first and second portions 60 and 62. More specifically, measuring device 70 is coupled to first portion 60, and second portion 62 is coupled circumferentially around an exterior surface of both measuring device 70 and first portion 60 to facilitate protecting measuring device 70 from damage. In the exemplary embodiment, both first and second portions 60 and 62 are coupled to shaft 24 using a plurality of fasteners 66, and are therefore configured to rotate with shaft 24.

Figure 3:
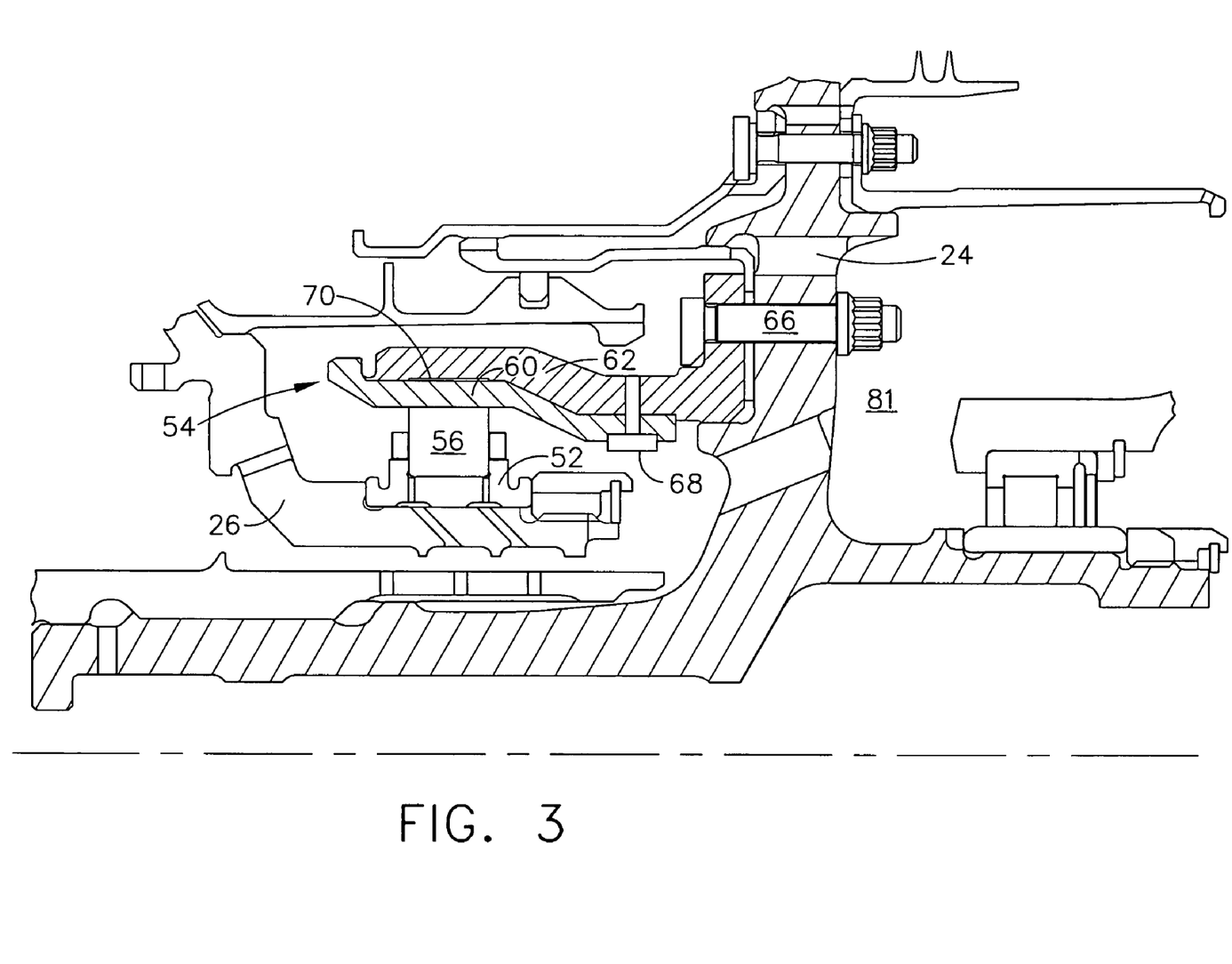
FIG. 3 is a cross-sectional view of an exemplary outer race that may be used with the differential bearing assembly shown in FIG. 2.

In another exemplary embodiment (shown in FIG. 3), outer race 54 includes first portion 60 and second portion 62 that is substantially L-shaped, and at least one measuring device 70 that is coupled to first portion 60. In the exemplary embodiment, measuring device 70 is positioned between first and second portions 60 and 62. More specifically, measuring device 70 is coupled to first portion 60 and second portion 62 is coupled radially around an exterior surface of both measuring device 70 and first portion 60 to facilitate protecting measuring device 70 from damage. In the exemplary embodiment, first portion 60 is coupled to second portion 62 using a plurality of fasteners 68, and second portion 62 is coupled to shaft 24 using a plurality of fasteners 66. Accordingly, and in the exemplary embodiment, first and second portions 60 and 62, and measuring device 70 are all configured to rotate with shaft 24.

Figure 4:
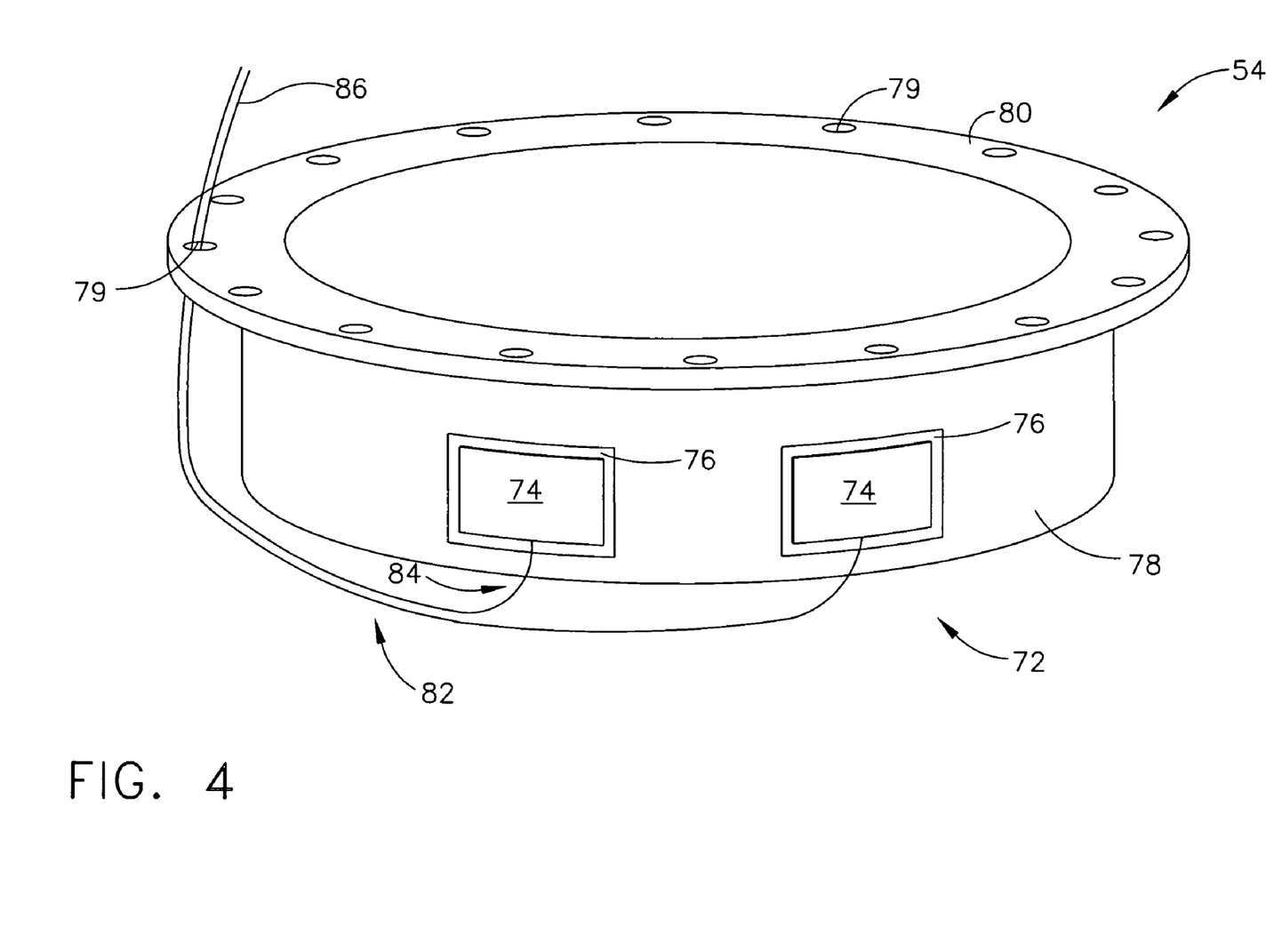
FIG. 4 is a perspective view of the outer race shown in FIG. 2.

FIG. 4 is a perspective view of outer race 54 (shown in FIGS. 2 and 3) that includes measuring device 70. Measuring device 70 is coupled to outer race 54 and is therefore configured to rotate with outer race 54. In the exemplary embodiment, measuring device 70 is a wire strain gage 72 that is configured to transmit a signal indicative of the reaction forces within bearing assembly 50 to an external monitoring system (not shown) for further analysis. Strain gage as used herein is defined as a resistive elastic unit whose change in resistance is a function of applied strain in accordance with Equation 1:

$$\frac{dR}{R} = S * \varepsilon \quad \text{(Equation 1)}$$

wherein S is the strain sensitivity factor of the gage material, R is the resistance, and $\varepsilon$ is the strain. In the exemplary embodiment, wire strain gage 72 includes at least one resistor 74, such as, but not limited to a metal foil, that is bonded to a respective elastic backing 76, which is then bonded to an exterior surface 78 of outer race 54. In use, the resistance of the wire, i.e. resistor 74, increases with increasing strain and decreases with decreasing strain as shown in Equation 2:

$$R = \rho \frac{l}{A} \quad \text{(Equation 2)}$$

wherein R is the total resistance, $\rho$ is resistivity, l is the length of the wire, and A is the cross-sectional area of the wire. Accordingly, the resistance change R is a combination effect of changes in length, cross-sectional area, and resistivity of wire 74. In an alternative embodiment, strain gage 72 is a semiconductor strain gage, for example. During operation, strain gage 72 is therefore configured to convert mechanical motion into an electronic signal, such that a change in capacitance, inductance, and/or resistance is proportional to the strain experienced by strain gage 72. For example, when wire 74 is held under tension, it gets slightly longer and its cross-sectional area is reduced. This changes its resistance (R) in proportion to the strain sensitivity (S) of wire 74 resistance. When a strain is introduced, the strain sensitivity, which is also called the gage factor therefore increases.

Strain gage 72 is suitably configured to measure a particular type of strain, or combinations of strains in more than one direction. For example, a strain gage that includes a single element foil is used to measure the strain of an element in a known direction, a double element foil is used to measure the strain in two known directions, a three element rosette is used to measure biaxial strain in unknown directions, a four element, full bridge element is used to measure tangential and radial strain, etc.

In the exemplary embodiment, measuring device 70 is coupled to outer race exterior surface 78 such that strain gage 72 is a surface mounted strain gage 72. In an alternative embodiment, strain gage 72 is embedded at least partially within outer race 54. In the exemplary embodiment, a single strain gage 72 is coupled to outer race 54 to facilitate predicting a failure of bearing assembly 50. In an alternative embodiment, a plurality of strain gages 72 are coupled to outer race 54 to facilitate predicting a failure of bearing assembly 50.

Outer race 54 also includes a mounting flange 80 that is configured to couple outer race 54 to gas turbine engine 10. Specifically, mounting flange 80 includes a plurality of openings 79 that are sized to receive a fastener 66 to facilitate coupling outer race 54 to shaft 24. In the exemplary embodiment, outer race 54 and flange 80 are formed together unitarily.

Figure 5:
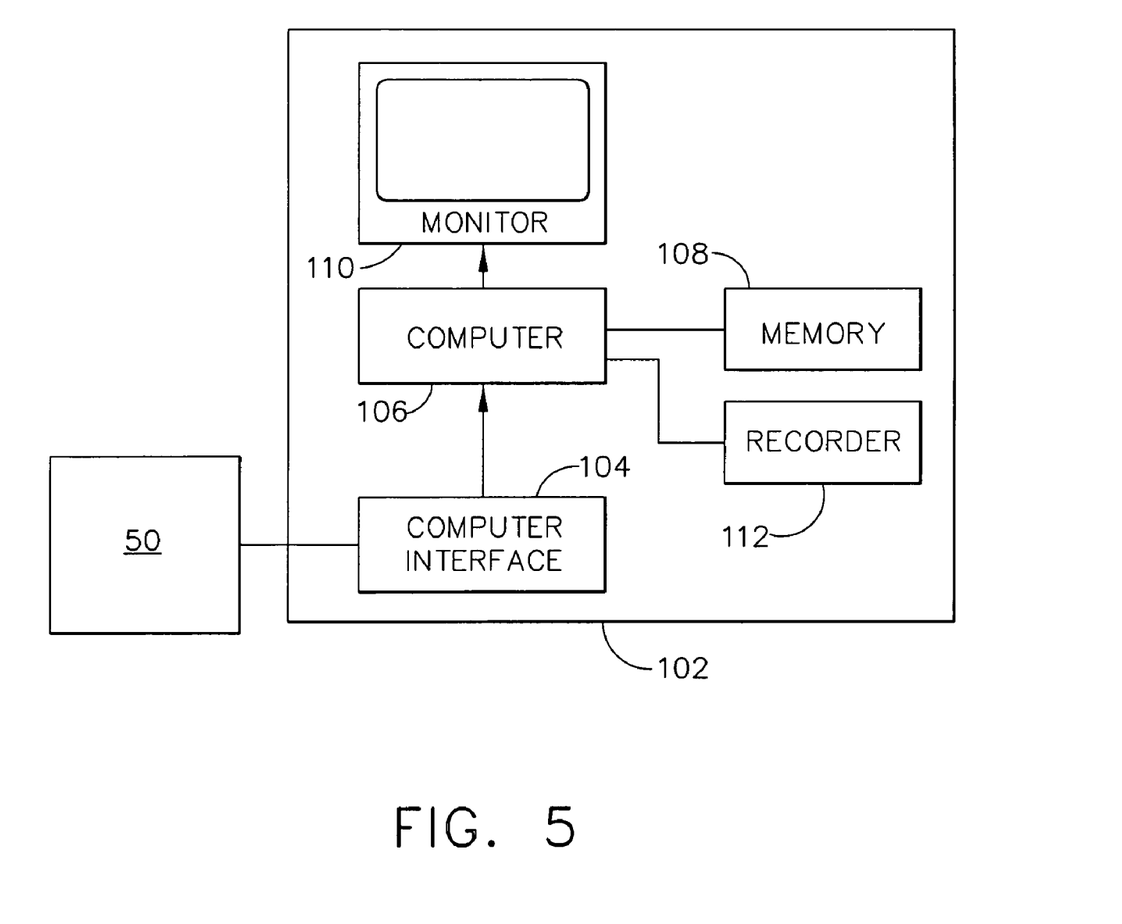
FIG. 5 is a bearing monitoring system that may be used to monitor the differential bearing assemblies shown in FIGS. 2 and 3.

Bearing assembly 50 also includes a wiring harness 82 to facilitate electrically coupling strain gage 72 to a bearing monitoring system such as bearing monitoring system 100 (shown in FIG. 5). Wiring harness 82 is coupled to a transmitter (not shown) that is configured to transmit a signal such as, but not limited to, an RF signal, to bearing monitoring system 100. In an alternative embodiment, wiring harness 82 is electrically coupled to bearing monitoring system 100 using a plurality of electrical connectors (not shown). During assembly, a wiring harness first end 84 is coupled to each respective strain gage 72, and a wiring harness second end 86 is channeled through at least one opening 79 and into a bearing cavity 81 to facilitate transmitting a signal such as, but not limited to, an RF signal, to bearing monitoring system 100.

FIG. 5 is a bearing monitoring system 100 that may be used to monitor a gas turbine engine bearing such as, but not limited to, bearing assembly 50 (shown in FIG. 2). In the exemplary embodiment, bearing monitoring system 100 is coupled to core gas turbine engine 10 and includes a data acquisition/control system 102 that is coupled to bearing assembly 50 such that data collected from bearing assembly 50 can be transmitted to/from data acquisition/control system 102. Data acquisition/control system 102 includes a computer interface 104, a computer 106, such as a personal computer, a memory 108, and a monitor 110. Computer 106 executes instructions stored in firmware (not shown). Computer 106 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Memory 108 is intended to represent one or more volatile and/or nonvolatile storage facilities not shown separately that are familiar to those skilled in the art. Examples of such storage facilities often used with computer 106 include solid state memory (e.g., random access memory (RAM), read-only memory (ROM), and flash memory), magnetic storage devices (e.g., floppy disks and hard disks), optical storage devices (e.g., CD-ROM, CD-RW, and DVD), and so forth. Memory 108 may be internal to or external to computer 106. In the exemplary embodiment, data acquisition/control system 102 also includes a recording device 112 such as, but not limited to, a strip chart recorder, a C-scan, and an electronic recorder, electrically coupled to at least one of computer 106 and bearing assembly 50.

Figure 6:
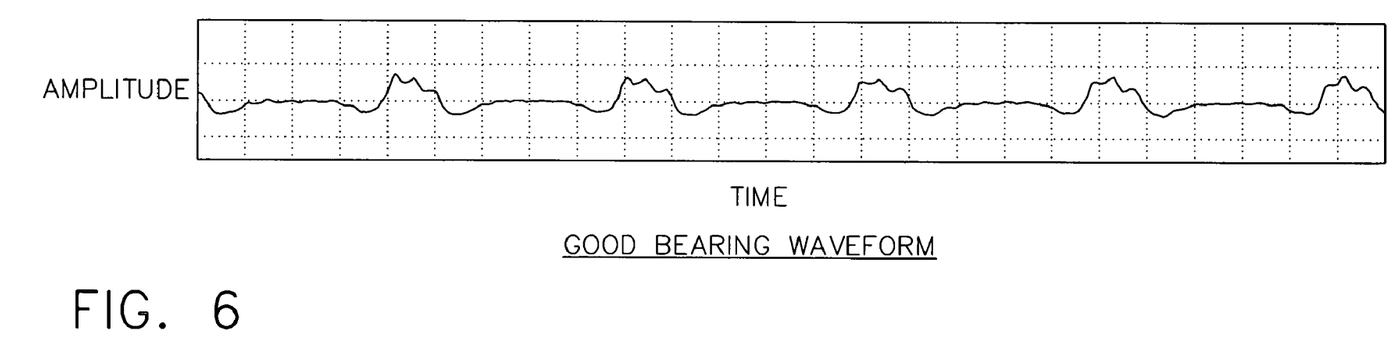
FIGS. 6 and 7 are graphical illustrations of data generated by the bearing monitoring system during normal operation.
Figure 7:
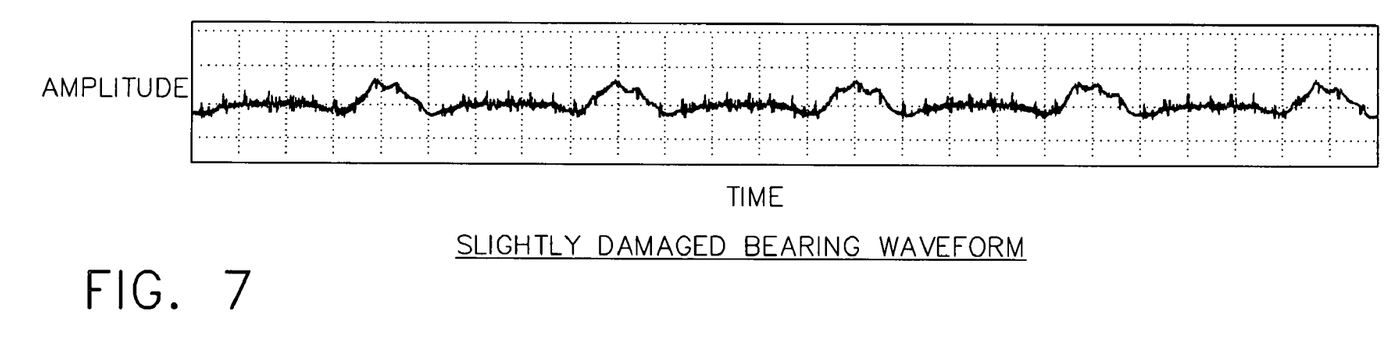

FIGS. 6 and 7 are graphical illustrations of the bearing monitoring system during normal operation. During engine operation, a signal indicative of bearing strain is transmitted from strain gage 72 to bearing monitoring system 100. In the exemplary embodiment, data collected from each respective strain gage 72 is compared to known bearing data using an algorithm, installed on computer 106 for example, to determine a resultant strain for differential bearing assembly 50. More specifically, computer 106 utilizes the information received from strain gage 72 to determine an amplitude and frequency of bearing assembly 50. Accordingly, the amplitude and frequency of bearing assembly 50 can be utilized as an indicator of bearing wear for any bearing, such as, but not limited to differential bearing assembly 50.

For example, as shown in FIG. 6, data received from strain gage 72 is graphed utilizing bearing monitoring system 100. As shown in FIG. 6, the graphical illustration shows that bearing assembly 50 is operating normally, i.e. bearing assembly 50 does not indicate any potential failure, thus the data shown in FIG. 6 may be utilized as a baseline model of bearing assembly 50. However, as shown in FIG. 7, the graphical illustration includes several higher order harmonics which may indicate that bearing assembly 50 is experiencing bearing damage and/or spall propagation which may result in an In Flight Shut Down (IFSD), and/or an Unscheduled Engine Removal (UER).

Accordingly, strain gage 72 and bearing monitoring system 100 facilitate predicting a bearing failure. More specifically, data is continuously collected from bearing assembly 50 utilizing bearing monitoring system 100. The data is then analyzed utilizing an algorithm installed on computer 106 to evaluate the current operational state of bearing assembly 50. In the exemplary embodiment, the data is compared to known data, i.e. a bearing performance model, to estimate a future date in which bearing assembly 50 may possibly fail. Accordingly, bearing assembly 50 can be repaired or replaced prior to an In Flight Shut Down (IFSD) to facilitate avoiding an Unscheduled Engine Removal (UER).

The bearing assembly described herein can be utilized to facilitate predicting damage to a differential bearing before significant damage occurs. Specifically, a strain gage is coupled to the bearing assembly to facilitate determining current damage to the differential bearing. A bearing monitoring system utilizes the information received from the strain gage to predict damage progression to the bearing such as pitting, peeling, indentation, or smearing. The strain gage described herein is also effective in determining when the lubricant film between the ball and the damaged raceway are creating a metal-to-metal contact since the signature of the bearing is different than the baseline signature.

The above-described bearing assemblies are cost-effective and highly reliable. The bearing assembly includes an inner race, an outer race, and at least one strain gage that is coupled to the outer race. The strain gage facilitates detecting initial bearing flaws and/or defects that may result in bearing spalling, monitoring bearing damage and/or spall propagation, and/or assessing the overall bearing damage including multi-spall initiations and progression. As a result, the bearing assembly, including the strain gage, facilitates reducing In Flight Shut Downs and/or Unscheduled Engine Removals.

Exemplary embodiments of a bearing assembly are described above in detail. The bearing assembly is not limited to the specific embodiments described herein, but rather, components of each bearing assembly may be utilized independently and separately from other components described herein. Specifically, the strain gage described herein can also be used in combination with a wide variety of bearings in a variety of mechanical systems.

While the invention has been described in terms of various specific embodiments, those skilled in the art will recognize that the invention can be practiced with modification within the spirit and scope of the claims.

What is claimed is:

1. A method for predicting bearing failure of a differential bearing including an inner race, an outer race, and a plurality of rolling elements positioned between the inner and outer race, said method comprising:
   coupling a strain gage to the differential bearing;
   generating a bearing performance model;
   receiving a signal from the strain gage; and
   comparing the strain gage signal to the bearing performance model to predict a differential bearing failure.

2. A method in accordance with claim 1 wherein coupling a strain gage to the differential bearing comprises coupling a strain gage to the differential bearing outer race such that the strain gage rotates with the outer race.

3. A method in accordance with claim 2 wherein said outer race comprises a first portion and a second portion, said method further comprising coupling a strain gage to the first portion, and coupling the second portion circumferentially around the first portion to facilitate protecting the strain gage.

4. A method in accordance with claim 1 further comprising coupling the differential bearing between a first shaft and a second shaft.

5. A method in accordance with claim 1 further comprising transmitting a signal from the swain gage to a bearing monitoring system utilizing a radio frequency signal.

6. A method in accordance with claim 1 further comprising:
   utilizing the strain gage signal to identify a bearing spall; and
   utilizing a bearing monitoring system to monitor the progression of the bearing spall.

7. A differential bearing assembly for a rotor, said differential bearing assembly comprising:
   an inner race coupled to a first shaft;
   an outer race coupled to a second shaft, said outer race comprising a first portion, and a second portion coupled circumferentially around said first portion, at least one of said first portion and said second portion comprising a flange portion extending radially with respect to said second shaft, said outer race coupled to said second shaft using the flange portion;
   a plurality of rolling elements positioned between said inner and outer races; and
   a strain gage coupled to said outer race, said strain gage configured to transmit a signal to a bearing monitoring system to facilitate predicting a failure of said differential bearing.

8. A differential bearing assembly in accordance with claim 7 wherein said strain gage comprises at least one of a wire strain gage and a semiconductor strain gage.

9. A differential bearing assembly in accordance with claim 7 wherein said strain gage is configured to transmit a signal to said bearing monitoring system utilizing a radio frequency signal.

10. A differential bearing assembly in accordance with claim 7 wherein said outer race comprises a plurality of openings, said bearing assembly further comprises:
   a plurality of fasteners extending through said openings and configured to couple said outer race to said second shaft; and
   a wiring harness coupled to said strain gage, said wiring harness inserted through at least one of said plurality of openings.

11. A differential bearing assembly in accordance with claim 7 wherein said bearing monitoring system is configured to utilize the strain gage signal to identify a bearing spall and monitor the progression of the bearing spall.

12. A differential bearing assembly in accordance with claim 7 wherein said strain gage is configured to determine an amplitude and frequency of said differential bearing assembly.

13. A gas turbine engine assembly comprising:
   a core gas turbine engine comprising
   a first rotor shaft;
   a second rotor shaft;
   a differential bearing coupled between said first and second rotor shafts; and
   a strain gage coupled to said differential bearing and configured to transmit a signal to facilitate predicting a failure of said differential bearing.

14. A gas turbine engine assembly in accordance with claim 13 wherein said differential bearing comprises:
   an inner race coupled to said first shaft;
   an outer race coupled to said second shaft;
   a plurality of rolling elements positioned between said inner and outer races; and
   a strain gage coupled to said outer race.

15. A gas turbine engine assembly in accordance with claim 14 wherein said outer race comprises:
   a first portion; and
   a second portion coupled circumferentially around said first portion to facilitate protecting said strain gage.

16. A gas turbine engine assembly in accordance with claim 14 wherein said outer race comprises a plurality of openings, said differential bearing assembly further comprises:
   a plurality of fasteners extending through said openings and configured to couple said outer race to said second shaft; and
   a wiring harness coupled to said strain gage, said wiring harness inserted through at least one of said plurality of openings.

17. A gas turbine engine assembly in accordance with claim 13 wherein said strain gage comprises at least one of a wire strain gage and a semiconductor strain gage.

18. A gas turbine engine assembly in accordance with claim 13 further comprising a bearing monitoring system, said strain gage is configured to transmit a signal to said bearing monitoring system utilizing a radio frequency signal.

19. A gas turbine engine assembly in accordance with claim 18 wherein said bearing monitoring system is configured to utilize the strain gage signal to identify a bearing spall and monitor the progression of the bearing spall.

* * * * *

UNITED STATES PATENT AND TRADEMARK OFFICE
CERTIFICATE OF CORRECTION

PATENT NO. : 7,634,913 B2  Page 1 of 1
APPLICATION NO. : 11/093642
DATED : December 22, 2009
INVENTOR(S) : Singh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1288 days.

Signed and Sealed this

Ninth Day of November, 2010

David J. Kappos
*Director of the United States Patent and Trademark Office*